(12) United States Patent
Woo et al.

(10) Patent No.: US 12,493,663 B2
(45) Date of Patent: Dec. 9, 2025

(54) DYNAMIC CONTENT RECOMMENDATIONS

(71) Applicant: Sonos, Inc., Santa Barbara, CA (US)

(72) Inventors: Sein Woo, Whittier, CA (US); Bona Kim, Boston, MA (US)

(73) Assignee: Sonos, Inc., Goleta, CA (US)

( * ) Notice: Subject to any disclaimer, the term of this patent is extended or adjusted under 35 U.S.C. 154(b) by 62 days.

(21) Appl. No.: 18/473,160

(22) Filed: Sep. 22, 2023

(65) Prior Publication Data

US 2024/0104151 A1 Mar. 28, 2024

Related U.S. Application Data

(60) Provisional application No. 63/409,675, filed on Sep. 23, 2022.

(51) Int. Cl.
G06F 16/9535 (2019.01)
G06F 3/0482 (2013.01)
G06F 16/438 (2019.01)
G06Q 30/0251 (2023.01)

(52) U.S. Cl.
CPC ........ *G06F 16/9535* (2019.01); *G06F 3/0482* (2013.01); *G06F 16/4387* (2019.01); *G06Q 30/0269* (2013.01)

(58) Field of Classification Search
CPC ............. G06F 16/9535; G06F 16/4387; G06F 3/0482; G06Q 30/0269
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Huawen A Peng

(57) ABSTRACT

A computing device may be configured to (i) operate as a control device of a media playback system including first and second playback devices, each associated with a respective playback queue, (ii) determine that a first playback queue associated with the first playback device is empty, (iii) based on the determination, determine content recommendations based on context information related to the first playback device, (iv) display indications of the first and second playback devices, where (a) the indication of the second playback device indicates media content identified in a second playback queue associated with the second playback device, and (b) the indication of the first playback device includes a selectable indication for each content recommendation for the first playback queue, (v) receive a selection of a content recommendation, and (vi) based on the received input, populate the first playback queue with media content corresponding to the selected content recommendation.

20 Claims, 14 Drawing Sheets

(56) References Cited

U.S. PATENT DOCUMENTS

| | | |
|---|---|---|
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2014/0108585 A1* | 4/2014 | Barton ............... G06F 16/9577 709/213 |
| 2020/0192558 A1* | 6/2020 | Chase .................. G06F 3/167 |
| 2021/0176531 A1* | 6/2021 | Larson ............. H04N 21/4668 |
| 2022/0075505 A1* | 3/2022 | Herzog ............... G06F 3/0488 |
| 2023/0106600 A1* | 4/2023 | Coffman .............. G06F 3/165 715/717 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), Di 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

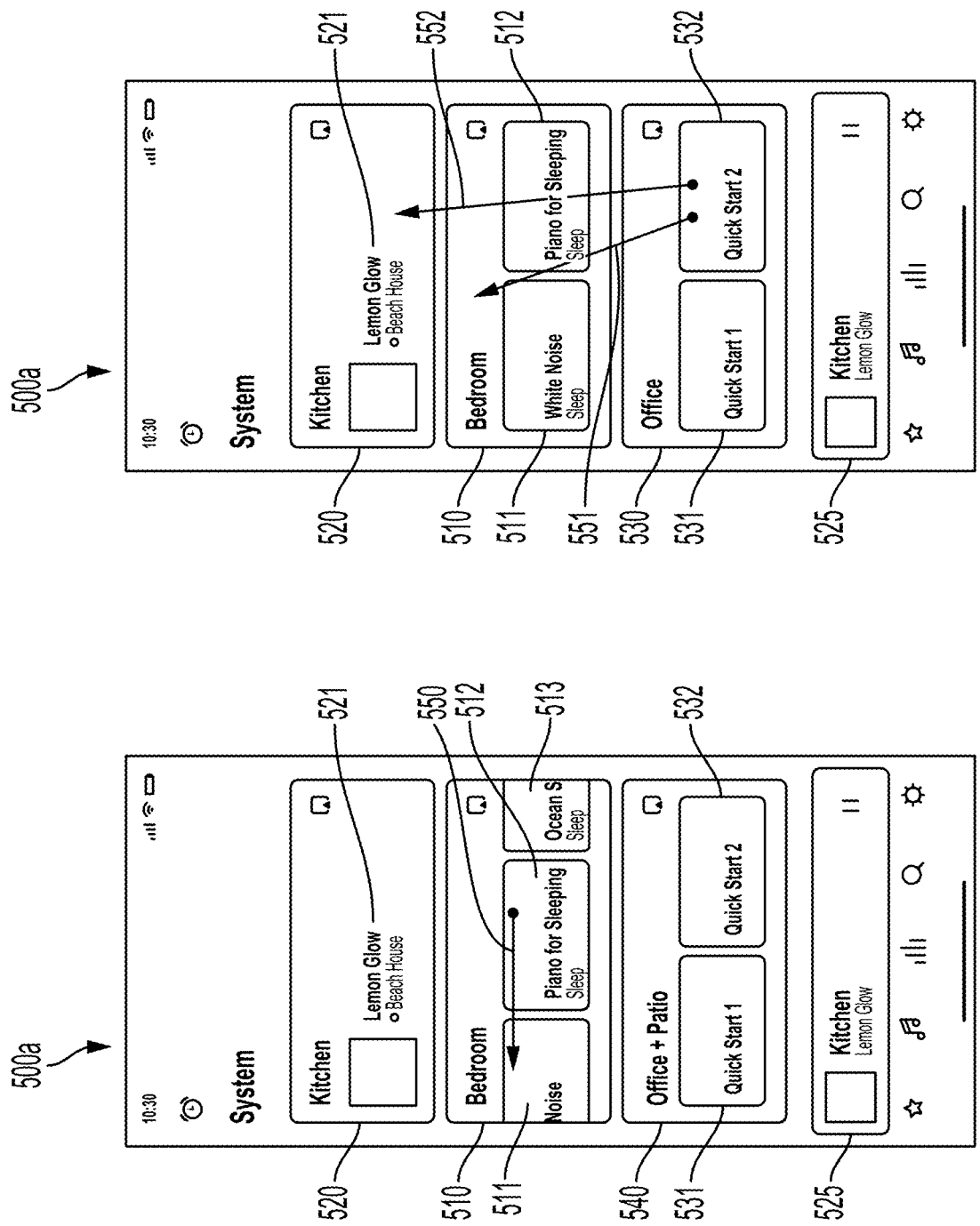

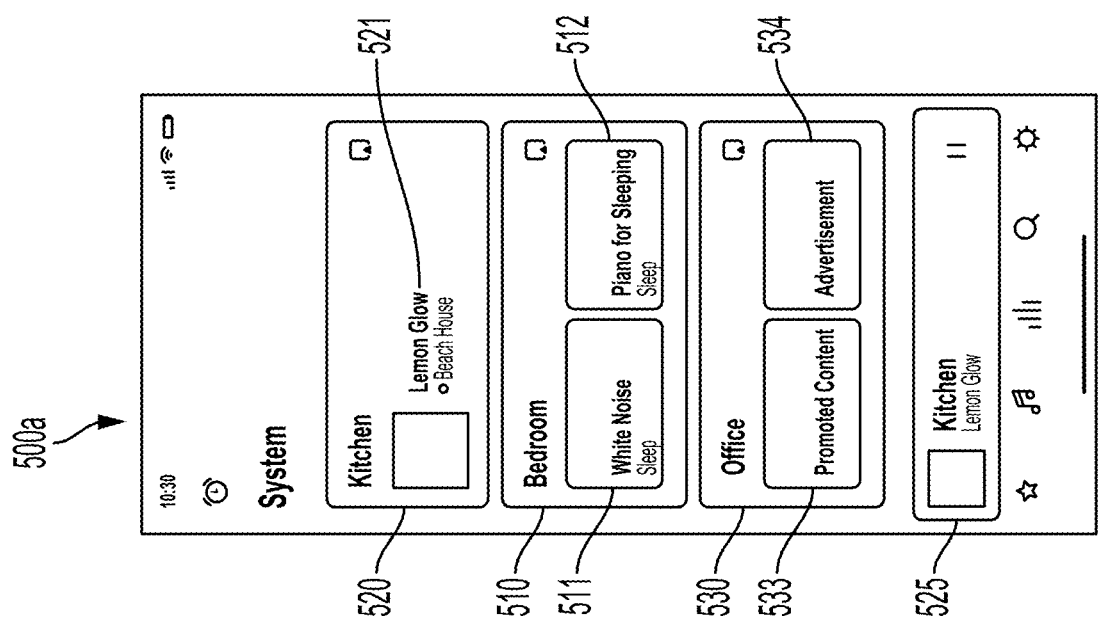

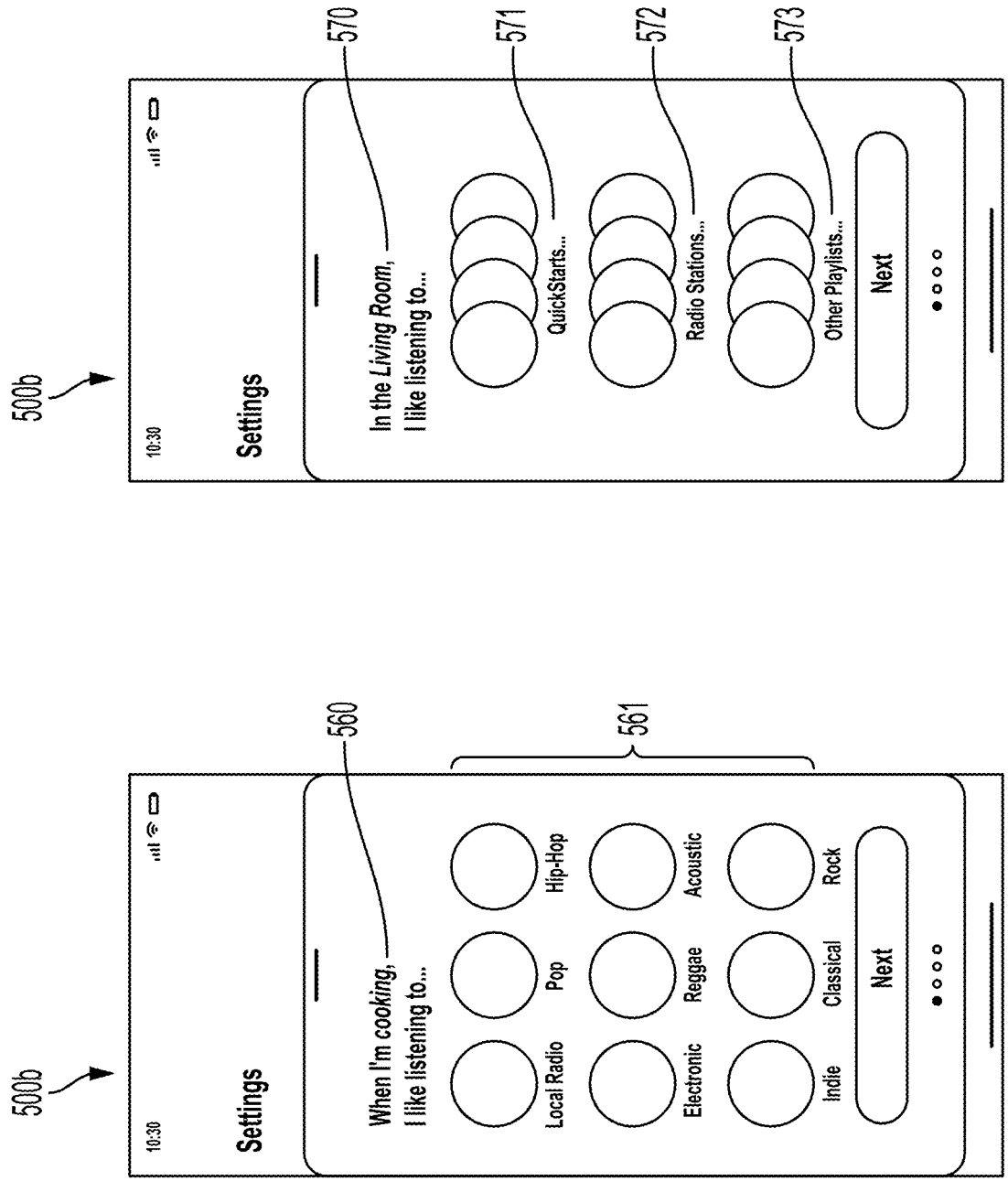

DYNAMIC CONTENT RECOMMENDATIONS

CROSS-REFERENCE TO RELATED APPLICATIONS

This application claims priority to U.S. Provisional Application No. 63/409,675, filed Sep. 23, 2022, and titled "Dynamic Content Recommendations," the contents of which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 5C is another schematic diagram of an example user interface on a control device.

FIG. 5D is another schematic diagram of an example user interface on a control device.

FIG. 5E is another schematic diagram of an example user interface on a control device.

FIG. 6A is another schematic diagram of an example user interface on a control device.

FIG. 6B is another schematic diagram of an example user interface on a control device.

Figure 1A:
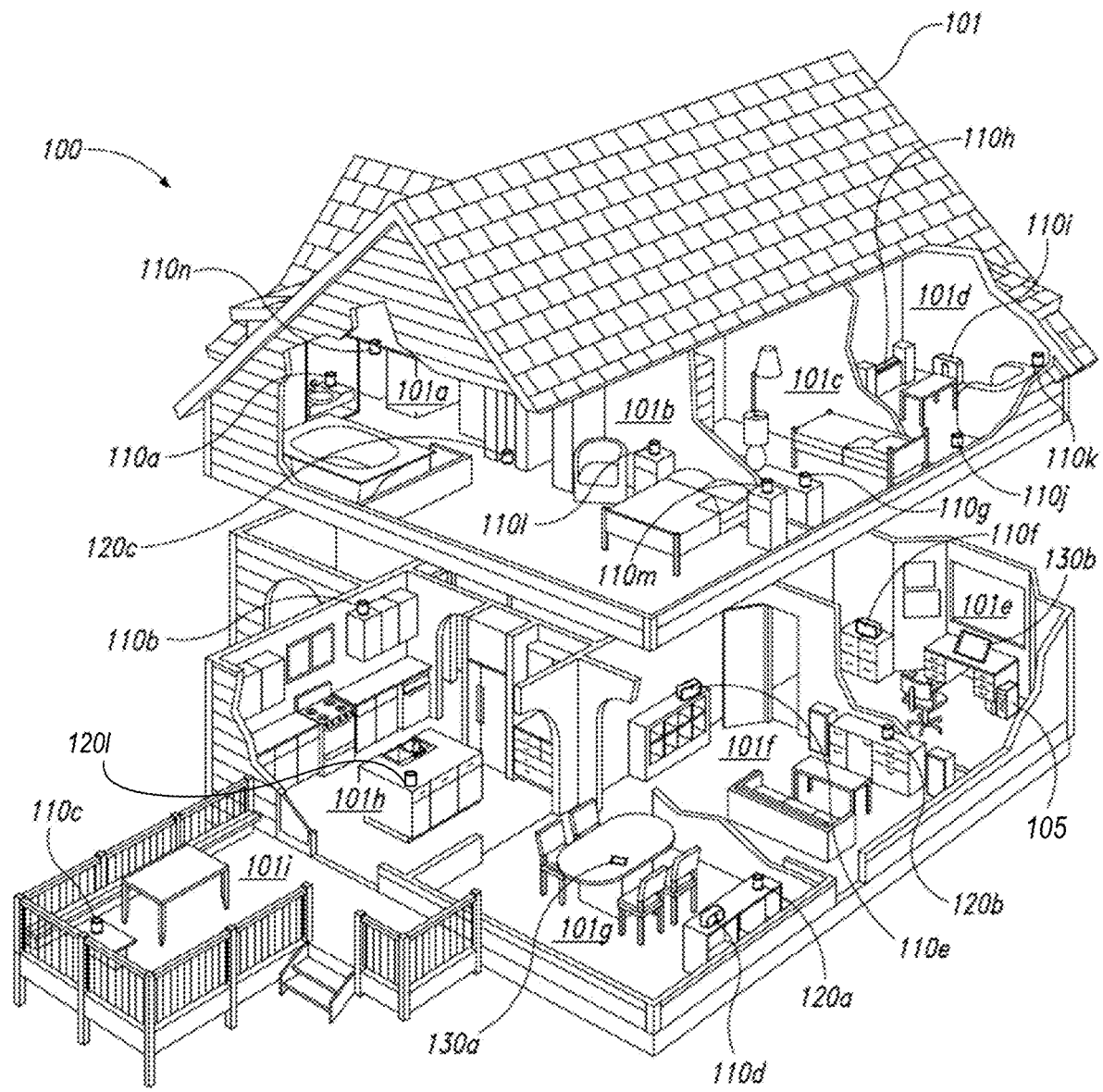
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to techniques for dynamically determining content recommendations for a playback queue associated with a playback device in a media playback system, based in part on a determination that the playback queue is empty. The content recommendations may then be dynamically displayed as selectable indications within a Rooms menu of a software control application for media playback system. In this way, an indication of the given playback device within the Rooms menu, which might otherwise by accompanied by blank space or a notification that no content is selected to denote the empty playback queue, may instead include the selectable indications of one or more content recommendations that act as shortcuts to quickly select and playback the recommended content. Accordingly, the techniques discussed herein can substantially reduce the time it takes a user to navigate a software control application in order to play back content, which might otherwise require inputs to select the desired playback device, open a content browsing menu, browse to find the desired content, and then select the desired content for playback. Other benefits will also become apparent from the following description.

In some implementations, the content recommendations for an empty playback queue may be based in part on context information related to the playback device with which the empty playback queue is associated. This context information may take various forms, including one or more of a playback history of the playback device, a day, a time, a name assigned to the playback device, or a media playback system user account associated with the control device on which the content recommendation will be displayed. Numerous other examples are possible.

Further, various aspects of the content recommendations discussed herein may be customizable by a user through the input of preference information. For example, the user may opt out of receiving content recommendations for some or all playback devices in their media playback system. As another example, the user may designate certain types of content (e.g., an artist, genre of music, etc.) that they enjoy listening to in a particular room, or at a particular time of day, or while engaging in a particular activity, which may further inform the determined content recommendations.

In some cases, the determined content recommendations may include routines and/or quickstart content that have been defined by a user to cause a playback device to play back certain content, perhaps in association with a certain playback configuration (e.g., at a certain volume). As some examples, one quickstart might include an internet radio station that the user enjoys. Another quickstart might include a playlist that was curated by the user or perhaps by a music content service. In this regard, the content represented by a given quickstart might not be constant, as a playlist might be updated by its creator or other collaborators over time. Yet another quickstart might include new episodes from one or more podcasts that the user has designated. Further discussion of quickstart content and playback routines can be found in U.S. Pub. No. 2023/0096397 entitled "Intelligent User Interfaces for Playback Devices" and U.S. Pub. No. 2023-0095902 entitled "Routines for Playback Devices," which are each incorporated by reference herein in their entirety.

Accordingly, in one aspect, disclosed herein is a method that involves a computing device (i) operating as a control device of a media playback system comprising at least a first playback device and a second playback device, each playback device associated with a respective playback queue, (ii) determining that a first playback queue associated with the first playback device is empty, (iii) based on the determination that the first playback queue is empty, determining one or more content recommendations for the first playback queue based on context information related to the first playback device, (iv) displaying an interface comprising respective indications of the first playback device and the second playback device, wherein (a) the indication of the second playback device includes an indication of media content identified in a second playback queue associated with the second playback device, and (b) the indication of the first playback device includes a respective selectable indication, for each of the determined one or more content recommendations for the first playback queue, (v) receiving an input indicating a selection of a given content recommendation of the one or more content recommendations for the first playback queue, and (vi) based on the received input, populating the first playback queue with media content corresponding to the given content recommendation.

In another aspect, disclosed herein is a computing device that includes at least one processor, a non-transitory computer-readable medium, and program instructions stored on the non-transitory computer-readable medium that are executable by the at least one processor to cause the computing device to carry out the functions disclosed herein, including but not limited to the functions of the foregoing method.

In yet another aspect, disclosed herein is a non-transitory computer-readable storage medium provisioned with software that is executable to cause a computing device to carry out the functions disclosed herein, including but not limited to the functions of the foregoing method.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the figures, identical reference numbers identify generally similar, and/or identical, elements. To facilitate the discussion of any particular element, the most significant digit or digits of a reference number refers to the figure in which that element is first introduced. For example, element 110a is first introduced and discussed with reference to FIG. 1A. Many of the details, dimensions, angles and other features shown in the figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment a. Suitable Media Playback System

Figure 1B:
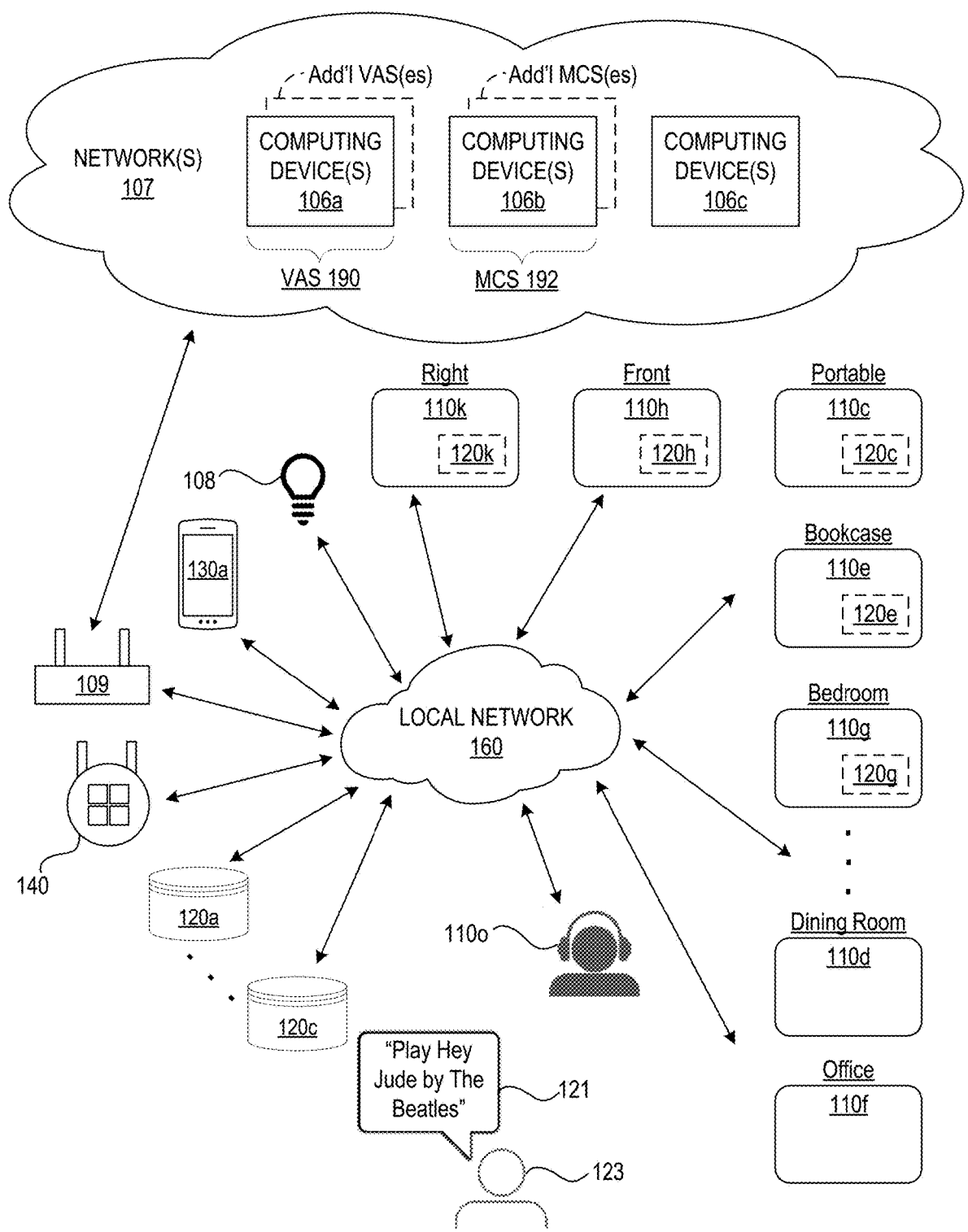
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110a) in synchrony with a second playback device (e.g., the playback device 110b). Interactions between the playback devices 110, NMDs 120, and/or control devices 130 of the MPS 100 configured in accordance with the various embodiments of the disclosure are described in greater detail below with respect to FIGS. 1B-1N.

In the illustrated embodiment of FIG. 1A, the environment 101 comprises a household having several rooms, spaces, and/or playback zones, including (clockwise from upper left) a Master Bathroom 101a, a Master Bedroom 101b, a Second Bedroom 101c, a Family Room or Den 101d, an Office 101e, a Living Room 101f, a Dining Room 101g, a Kitchen 101h, and an outdoor Patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added and/or removed to form, for example, the configuration shown in FIG. 1A. Each zone may be given a name according to a different room or space such as the Office 101e, Master Bathroom 101a, Master Bedroom 101b, the Second Bedroom 101c, Kitchen 101h, Dining Room 101g, Living Room 101f, and/or the Patio 101i. In some aspects, a single playback zone may include multiple rooms or spaces. In certain aspects, a single room or space may include multiple playback zones.

In the illustrated embodiment of FIG. 1A, the Master Bathroom 101a, the Second Bedroom 101c, the Office 101e, the Living Room 101f, the Dining Room 101g, the Kitchen 101h, and the outdoor Patio 101i each include one playback device 110, and the Master Bedroom 101b and the Den 101d include a plurality of playback devices 110. In the Master Bedroom 101b, the playback devices 110l and 110m may be configured, for example, to play back audio content in synchrony as individual ones of playback devices 110, as a bonded playback zone, as a consolidated playback zone, and/or any combination thereof. Similarly, in the Den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140 (FIG. 1B), and a local computing device 105 (FIG. 1A). Numerous other examples of local network devices (not shown) are also possible, such as doorbells, cameras, smoke alarms, televisions, gaming consoles, garage door openers, etc. In embodiments described below, one or more of the various playback devices 110 may be configured as portable playback devices, while others may be configured as stationary playback devices. For example, the headphones 110o (FIG. 1B) are a portable playback device, while the playback device 110e on the bookcase may be a stationary device. As another example, the playback device 110c on the Patio 101i may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to any number of different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106a may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, YOUTUBE MUSIC, APPLE MUSIC, GOOGLE PLAY, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added and/or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device(s) 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to detect sound, including voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120l (FIG. 1A) may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio 101i may be named "Portable" because it is battery-powered and/or readily transportable to different areas of the environment 101. Other naming conventions are possible.

As discussed above, an NMD may detect and process sound from its environment, including audio output played by itself, played by other devices in the environment 101, and/or sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word (also referred to herein as an activation word) associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/ or related data with the remote computing devices associated with the selected VAS. Such exchanges may be related to or independent of transmitted messages containing voice inputs. In some embodiments, the remote computing device (s) and the MPS 100 may exchange data via communication paths as described herein and/or using a metadata exchange channel as described in U.S. Pat. No. 10,499,146, issued Nov. 13, 2019 and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude" performed by The Beatles. After these determinations, the VAS 190 may transmit a command to a particular MCS 192 to retrieve content (i.e., the song "Hey Jude" by The Beatles), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Pat. No. 10,499,146.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc.

Additional details regarding assigning NMDs and playback devices as designated or default devices may be found, for example, in previously referenced U.S. Pat. No. 10,499,146.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
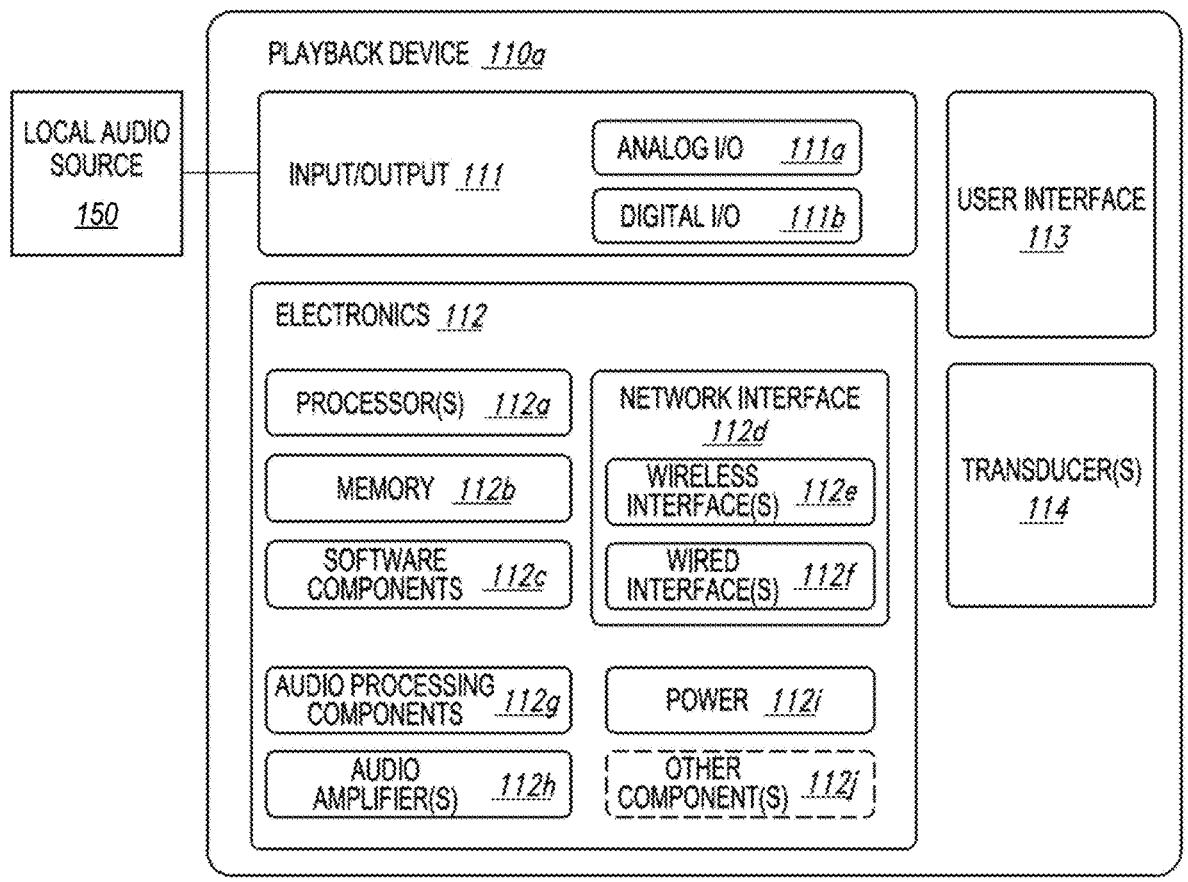
FIG. 1C is a block diagram of an example playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WIFI, BLUETOOTH, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/ output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106a-c via the local network 160 (FIG. 1B), amplify the received audio, and output the amplified audio for playback via one or more of the transducers 114. In some embodiments, the playback device 110a optionally includes one or more microphones (e.g., a single microphone, a plurality of microphones, a microphone array) (hereinafter referred to as "the microphones"). In certain embodiments, for example, the playback device 110a having one or more of the optional microphones can operate as an NMD configured to receive voice input from a user and correspondingly perform one or more operations based on the received voice input, which will be discussed in more detail further below with respect to FIGS. 1F and 1G.

In the illustrated embodiment of FIG. 1C, the electronics 112 comprise one or more processors 112a (referred to hereinafter as "the processors 112a"), memory 112b, software components 112c, a network interface 112d, one or more audio processing components 112g, one or more audio amplifiers 112h (referred to hereinafter as "the amplifiers 112h"), and power components 112i (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112j (e.g., one or more sensors, video displays, touchscreens, battery charging bases). In some embodiments, the playback device 110a and electronics 112 may further include one or more voice processing components that are operably coupled to one or more microphones, and other components as described below with reference to FIGS. 1F and 1G.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices and/or zones can be found, for example, in U.S. Pat. No. 8,234,395 entitled "System and method for synchronizing operations among a plurality of independently clocked digital data processing devices," which is herein incorporated by reference in its entirety.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112d is configured to facilitate a transmission of data between the playback device 110a and one or more other devices on a data network. The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more light components (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

Figure 1D:
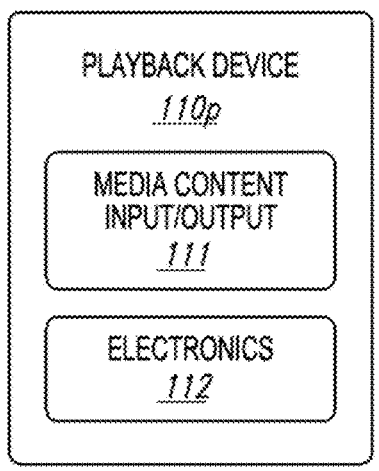
FIG. 1D is a block diagram of an example playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," "SUB," "ARC," "MOVE," and "ROAM." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more of the playback devices 110 may comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device may omit a user interface and/or one or more transducers. For example, FIG. 1D is a block diagram of a playback device 110*p* comprising the input/output 111 and electronics 112 without the user interface 113 or transducers 114.

Figure 1E:
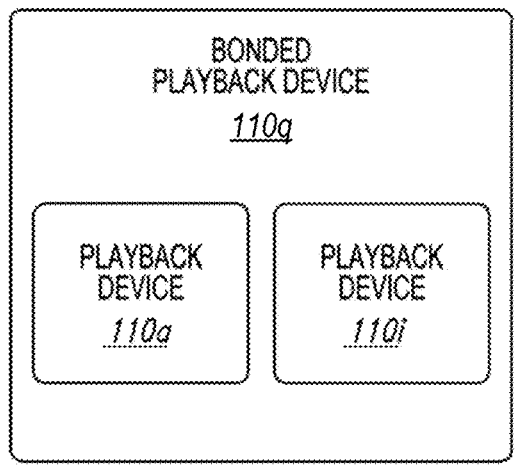
FIG. 1E is a block diagram of an example playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110a, when bonded with playback device 110i, is configured to render only the mid-range and high frequency components of a particular audio content, while the playback device 110i renders the low frequency component of the particular audio content. In some embodiments, the bonded playback device 110q includes additional playback devices and/or another bonded playback device.

Figure 2:
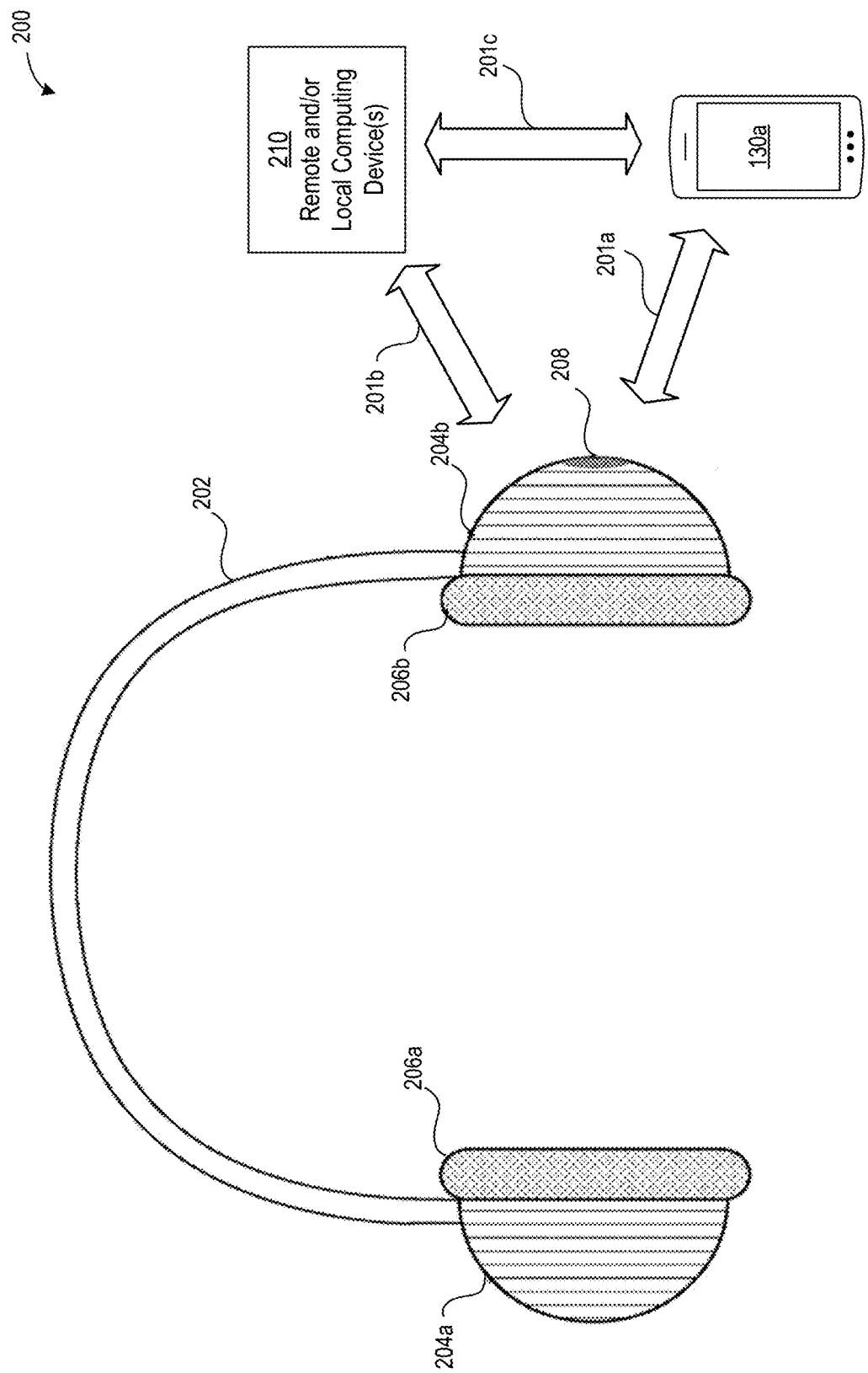
FIG. 2 is a diagram of an example headset assembly for an example playback device.

In some embodiments, one or more of the playback devices 110 may take the form of a wired and/or wireless headphone device (e.g., over-ear headphones, on-ear headphones, in-ear earphones, etc.). For instance, FIG. 2 shows an example headset assembly 200 ("headset 200") for such an implementation of one of the playback devices 110. As shown, the headset 200 includes a headband 202 that couples a first earcup 204a to a second earcup 204b. Each of the earcups 204a and 204b may house any portion of the electronic components in the playback device 110, such as one or more speakers. Further, one or both of the earcups 204a and 204b may include a user interface for controlling audio playback, volume level, and other functions. The user interface may include any of a variety of control elements such as a physical button 208, a slider (not shown), a knob (not shown), and/or a touch control surface (not shown). As shown in FIG. 2, the headset 200 may further include ear cushions 206a and 206b that are coupled to earcups 204a and 204b, respectively. The ear cushions 206a and 206b may provide a soft barrier between the head of a user and the earcups 204a and 204b, respectively, to improve user comfort and/or provide acoustic isolation from the ambient (e.g., passive noise reduction (PNR)).

As described in greater detail below, the electronic components of a playback device may include one or more network interface components (not shown in FIG. 2) to facilitate wireless communication over one more communication links. For instance, a playback device may communicate over a first communication link 201a (e.g., a BLUETOOTH link) with one of the control devices 130, such as the control device 130a, and/or over a second communication link 201b (e.g., a WIFI or cellular link) with one or more other computing devices 210 (e.g., a network router and/or a remote server). As another possibility, a playback device may communicate over multiple communication links, such as the first communication link 201a with the control device 130a and a third communication link 201c (e.g., a WIFI or cellular link) between the control device 130a and the one or more other computing devices 210. Thus, the control device 130a may function as an intermediary between the playback device and the one or more other computing devices 210, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone device. Wearable devices may include those devices configured to be worn about a portion of a user (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMDs)

Figure 1F:
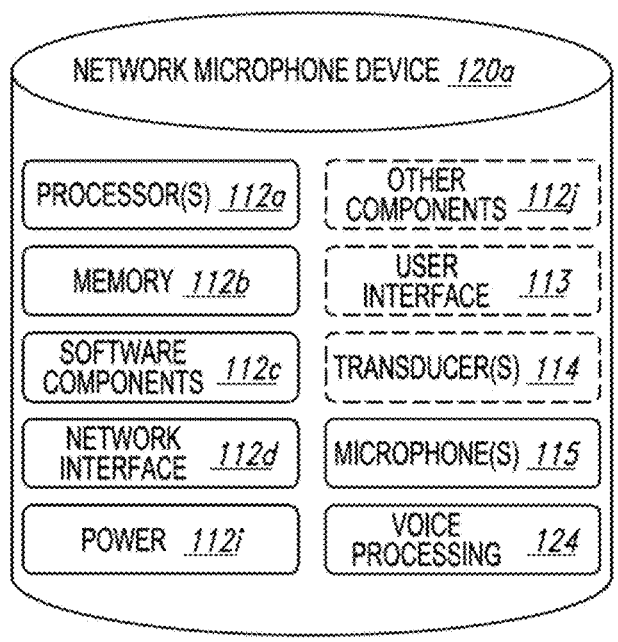
FIG. 1F is a block diagram of an example network microphone device.

FIG. 1F is a block diagram of the NMD 120a (FIGS. 1A and 1B). The NMD 120a includes one or more voice processing components 124 and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1C. In some aspects, for example, the NMD 120a includes the processor 112a and the memory 112b (FIG. 1C), while omitting one or more other components of the electronics 112. In some embodiments, the NMD 120a includes additional components (e.g., one or more sensors, cameras, thermometers, barometers, hygrometers).

Figure 1G:
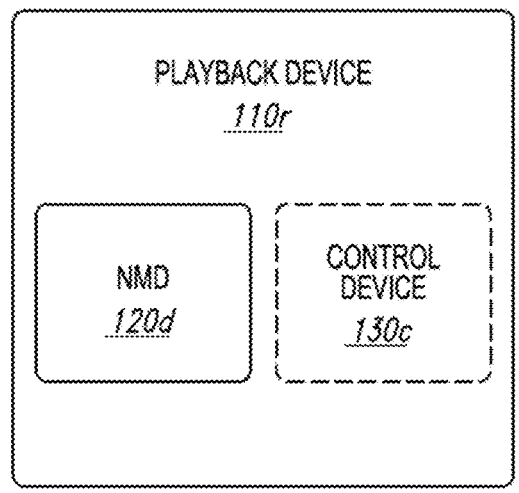
FIG. 1G is a block diagram of an example playback device.

In some embodiments, an NMD can be integrated into a playback device. FIG. 1G is a block diagram of a playback device 110r comprising an NMD 120d. The playback device 110r can comprise any or all of the components of the playback device 110a and further include the microphones 115 and voice processing components 124 (FIG. 1F). The microphones 115 are configured to detect sound (i.e., acoustic waves) in the environment of the playback device 110r, which may then be provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Pat. No. 10,499,146.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The NMD 120a may use the microphone data (or transmit the microphone data to another device) for calibrating the audio characteristics of one or more playback devices 110 in the MPS 100. As another example, one or more of the playback devices 110, NMDs 120, and/or control devices 130 of the MPS 100 may transmit audio tones (e.g., ultrasonic tones, infrasonic tones) that may be detectable by the microphones 115 of other devices, and which may convey information such as a proximity and/or identity of the transmitting device, a media playback system command, etc. As yet another example, the voice processing components 124 may receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

Figure 1H:
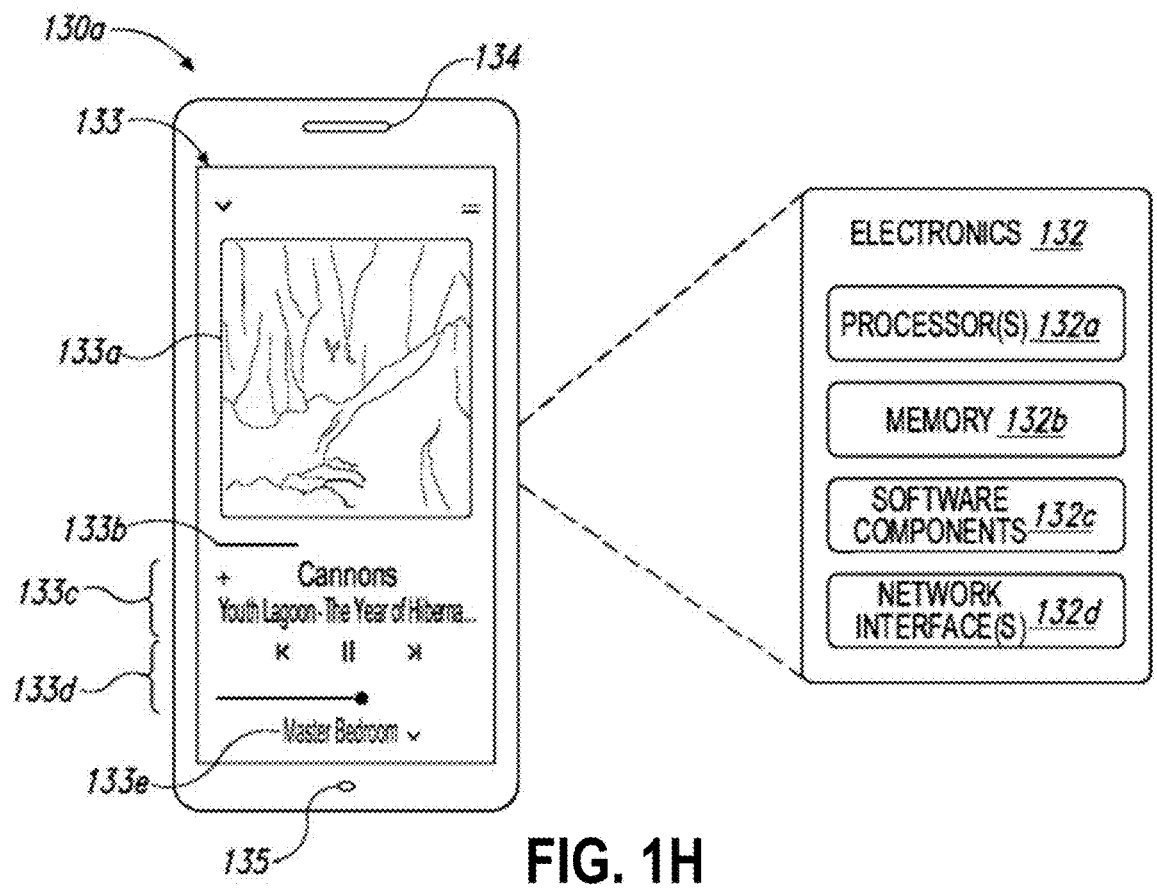
FIG. 1H is a partially schematic diagram of an example control device.

FIG. 1H is a partially schematic diagram of one example of the control device 130a (FIGS. 1A and 1B). As used herein, the term "control device" can be used interchangeably with "controller," "controller device," or "control system." Among other features, the control device 130a is configured to receive user input related to the MPS 100 and, in response, cause one or more devices in the MPS 100 to perform an action(s) and/or an operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the MPS 100. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processor(s) 132a"), a memory 132b, software components 132c, and a network interface 132d. The processor(s) 132a can be configured to perform functions relevant to facilitating user access, control, and configuration of the MPS 100. The memory 132b can comprise data storage that can be loaded with one or more of the software components executable by the processors 132a to perform those functions. The software components 132c can comprise applications and/or other executable software configured to facilitate control of the MPS 100. The memory 132b can be configured to store, for example, the software components 132c, media playback system controller application software, and/or other data associated with the MPS 100 and the user.

The network interface 132d is configured to facilitate network communications between the control device 130a and one or more other devices in the MPS 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among other changes. Additional description of zones and groups can be found below with respect to FIGS. 1J through 1N.

Figure 1I:
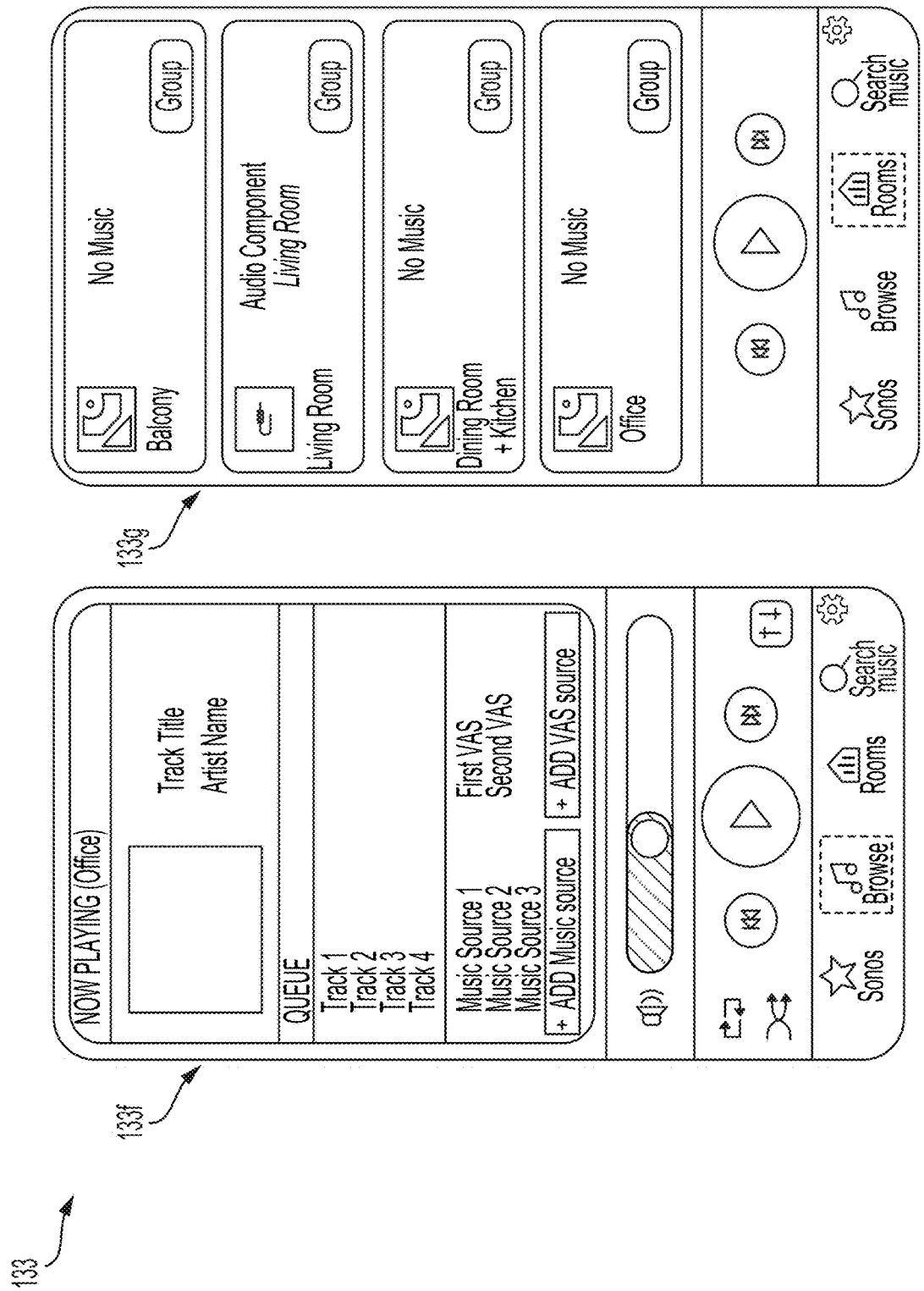
FIG. 1I is a schematic diagram of example user interfaces of the example control device of FIG. 1H.

The user interface 133 is configured to receive user input and can facilitate control of the MPS 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system. FIG. 1I shows two additional example user interface displays 133f and 133g of user interface 133. Additional examples are also possible.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1J:
FIGS. 1J through 1M are schematic diagrams of example corresponding media playback system zones.
Figure 1K:
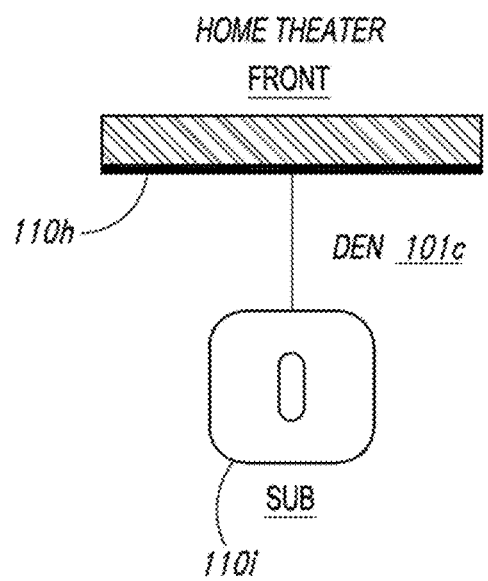
Figure 1L:
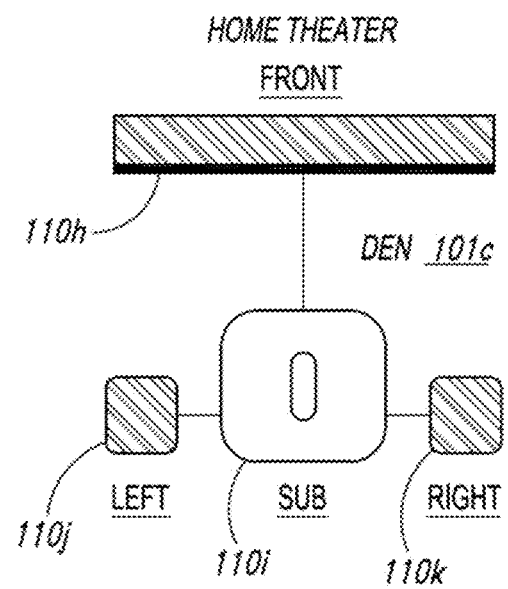
Figure 1M:
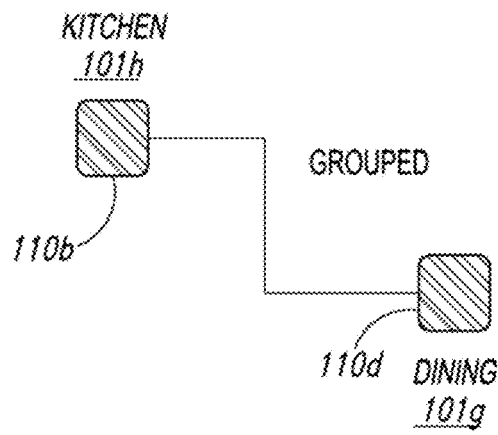
Figure 1N:
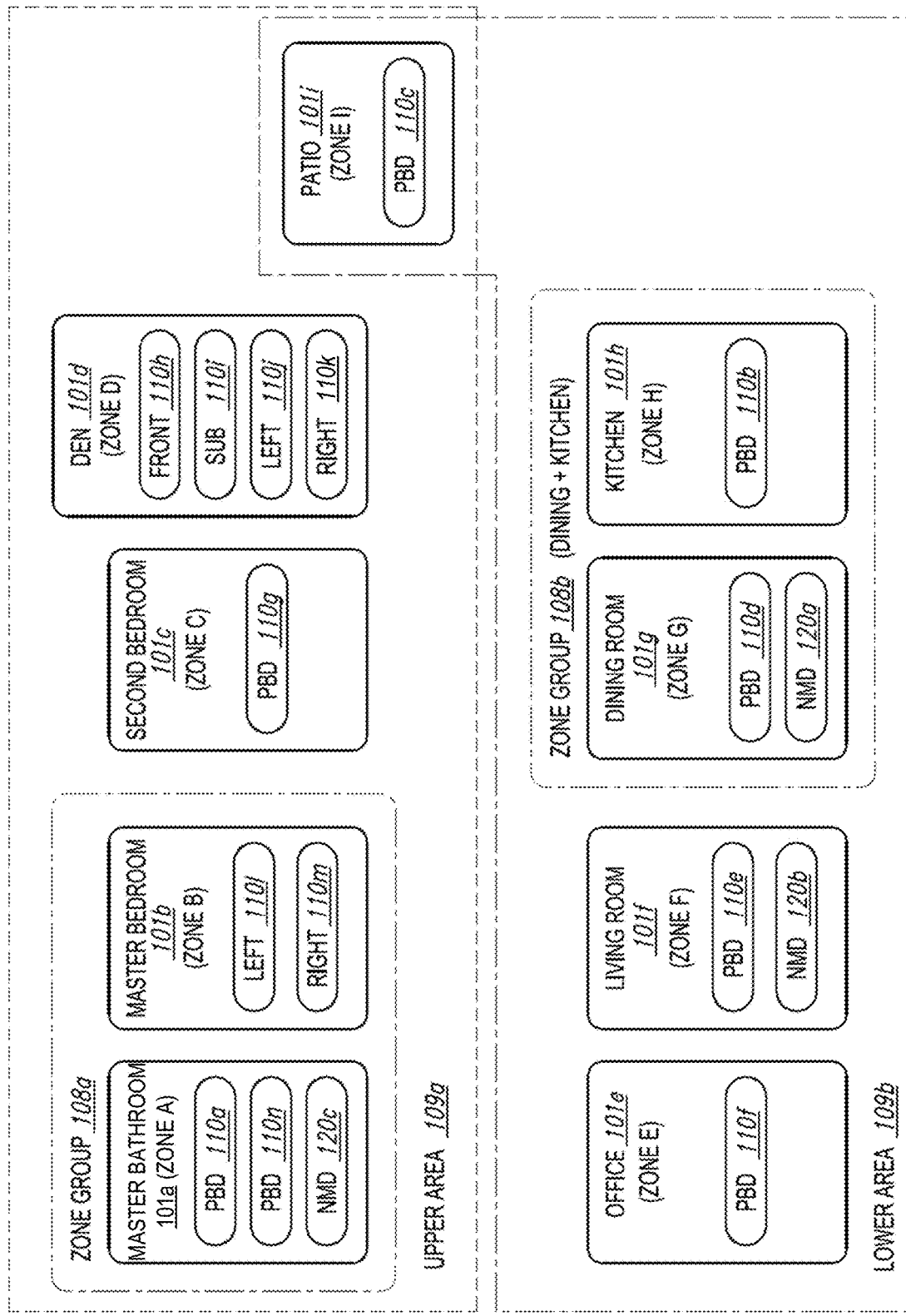
FIG. 1N is a schematic diagram of example media playback system areas.

FIGS. 1J, 1K, 1L, 1M, and 1N show example configurations of playback devices in zones and zone groups. Referring first to FIG. 1N, in one example, a single playback device may belong to a zone. For example, the playback device 110g in the Second Bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities), as will be described in more detail further below. In other implementations, multiple playback devices may be merged to form a single zone. As one example, the playback device 110a can be bonded to the playback device 110n and the NMD 120c to form Zone A. As another example, the playback device 110h (e.g., a front playback device) may be merged with the playback device 110i (e.g., a subwoofer), and the playback devices 110j and 110k (e.g., left and right surround speakers, respectively) to form a single Zone D. In yet other implementations, one or more playback zones can be merged to form a zone group (which may also be referred to herein as a merged group). As one example, the playback zones Zone A and Zone B can be merged to form Zone Group 108a. As another example, the playback zones Zone G and Zone H can be merged to form Zone Group 108b. The merged playback zones Zone G and Zone H may not be specifically assigned different playback responsibilities. That is, the merged playback zones Zone G and Zone H may, aside from playing audio content in synchrony, each play audio content as they would if they were not merged and operating as independent zones.

Each zone in the MPS 100 may be represented for control as a single user interface (UI) entity. For example, Zone A may be represented as a single entity named Master Bathroom. Zone B may be represented as a single entity named Master Bedroom. Zone C may be represented as a single entity named Second Bedroom.

In some implementations, as mentioned above playback devices that are bonded may have different playback responsibilities, such as responsibilities for certain audio channels. For example, as shown in FIG. 1J, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1K, the playback device 110h named Front may be bonded with the playback device 110i named SUB. The Front device 110h can be configured to render a range of mid to high frequencies and the SUB device 110i can be configured to render low frequencies. When unbonded, however, the Front device 110h can be configured to render a full range of frequencies. As another example, FIG. 1L shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 1N).

In other implementations, playback devices that are merged may not have assigned playback responsibilities and may each render the full range of audio content of which the respective playback device is capable. Nevertheless, merged devices may be represented as a single UI entity (i.e., a zone, as discussed above). For instance, the playback devices 110a and 110n in the Master Bathroom have the single UI entity of Zone A. In one embodiment, the playback devices 110a and 110n may each output the full range of audio content of which each respective playback devices 110a and 110n is capable, in synchrony.

In some embodiments, an NMD may be bonded or merged with one or more other devices so as to form a zone. As one example, the NMD 120c may be merged with the playback devices 110a and 110n to form Zone A. As another example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. Pat. No. 10,499,146.

As mentioned above, in some implementations, zones of individual, bonded, and/or merged devices may be grouped to form a zone group. For example, referring to FIG. 1N, Zone A may be grouped with Zone B to form a zone group 108a that includes the two zones, and Zone G may be grouped with Zone H to form the zone group 108b. However, other zone groupings are also possible. For example, Zone A may be grouped with one or more other Zones C-I. The Zones A-I may be grouped and ungrouped in numerous ways. For example, three, four, five, or more (e.g., all) of the Zones A-I may be grouped at any given time. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zone groups in an environment may be named by according to a name of a zone within the group or a combination of the names of the zones within a zone group. For example, Zone Group 108b can be assigned a name such as "Dining+Kitchen", as shown in FIG. 1N. In other implementations, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the Second Bedroom 101c may indicate (i) that the playback device 110g is the only playback device of the Zone C and (ii) that Zone C is not in a zone group. Identifiers associated with the Den 101d may indicate that the Den 101d is not grouped with other zones but includes bonded playback devices 110h-110k. Identifiers associated with the Dining Room 101g may indicate that the Dining Room 101g is part of the Dining+Kitchen Zone Group 108b and that devices 110d and 110b (Kitchen 101h) are grouped (FIGS. 1M, 1N). Identifiers associated with the Kitchen 101h may indicate the same or similar information by virtue of the Kitchen 101h being part of the Dining+Kitchen Zone Group 108b. Other example zone variables and identifiers are described below.

In yet another example, the MPS 100 may include variables or identifiers representing other associations of zones and zone groups, such as identifiers associated with Areas, as shown in FIG. 1N. An area may involve a cluster of zone groups and/or zones not within a zone group. For instance, FIG. 1N shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, issued Jul. 14, 2020, and titled "Room Association Based on Name," and U.S. Pat. No. 8,483,853, filed Sep. 11, 2007, issued Jul. 9, 2013, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
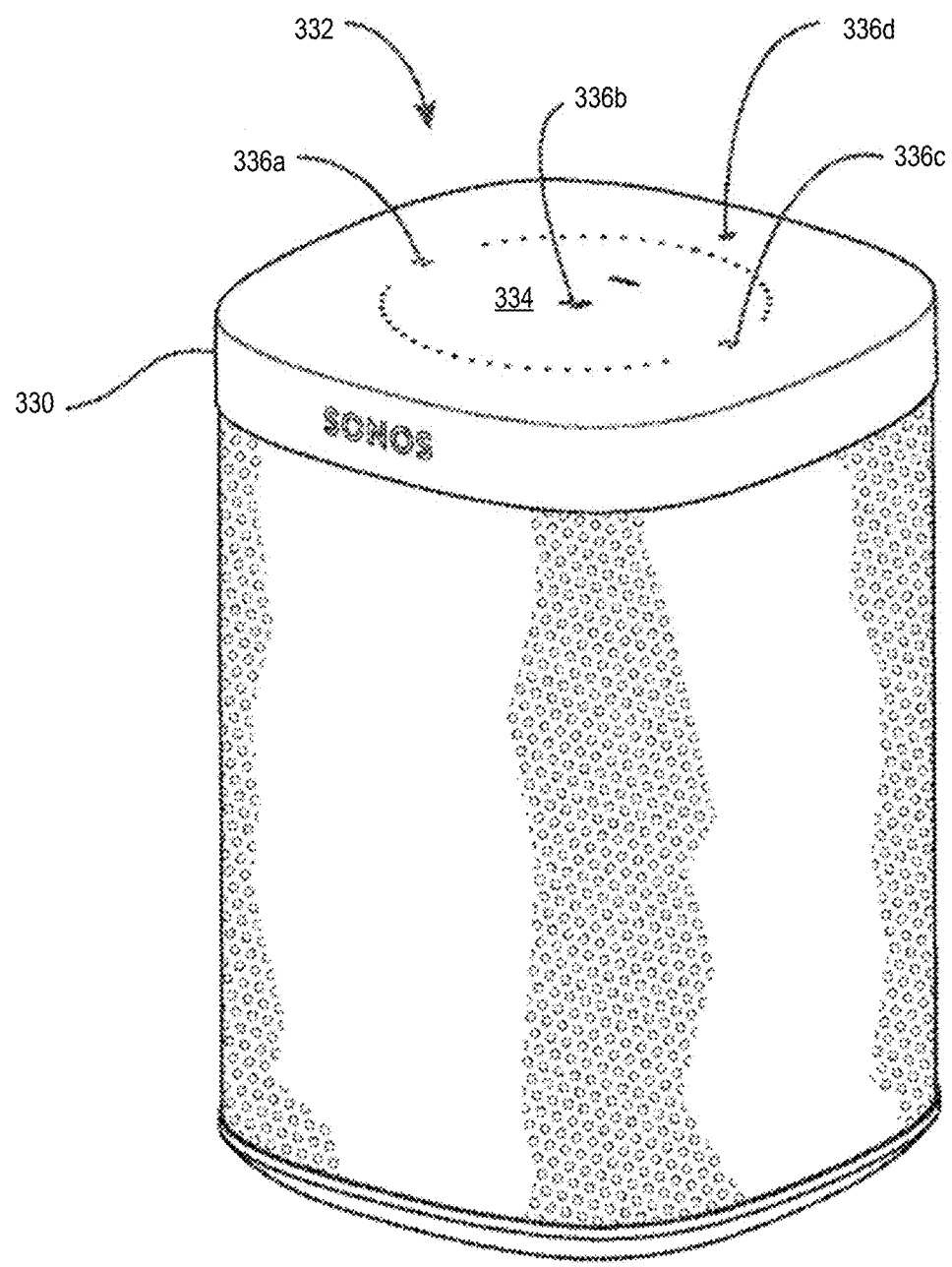
FIG. 3 is an isometric diagram of an example playback device housing.

FIG. 3 shows an example housing 330 of a playback device (e.g., a playback device 110) that includes a user interface in the form of a control area 332 at a top portion 334 of the housing 330. The control area 332 includes buttons 336a, 336b, and 336c for controlling audio playback, volume level, and other functions. The control area 332 also includes a button 336d for toggling one or more microphones (not visible in FIG. 3) of the playback device 110 to either an on state or an off state. The control area 332 is at least partially surrounded by apertures formed in the top portion 334 of the housing 330 through which the microphones receive the sound in the environment of the playback device. The microphones may be arranged in various positions along and/or within the top portion 334 or other areas of the housing 330 so as to detect sound from one or more directions relative to the playback device.

f. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV®, Roku®), gaming console, CD/DVD player, doorbell, intercom, telephone, tablet, or any other source of digital audio content.

A playback device that receives or otherwise obtains audio content from an audio source for playback and/or distribution to other playback devices may be referred to herein as the "sourcing" playback device, "master" playback device, or "group coordinator." One function of the "sourcing" playback device is to process received audio content for playback and/or distribution to other playback devices. In some embodiments, the sourcing playback device transmits the processed audio content to all the playback devices that are configured to play the audio content. In some embodiments, the sourcing playback device transmits the processed audio content to a multicast network address, and all the other playback devices configured to play the audio content receive the audio content via that multicast address. In some embodiments, the sourcing playback device alternatively transmits the processed audio content to each unicast network address of each other playback device configured to play the audio content, and each of the other playback devices configured to play the audio content receive the audio content via its unicast address.

III. Example Techniques for Dynamic Content Recommendations

As discussed above, a control device operating within a media playback system may be installed with a media playback system controller application or similar software that includes numerous options relating to the selection of content for playback. These may include options for selecting one or more playback devices of the media playback system on which to play the content, options for selecting a particular content service (e.g., streaming music provider) from which to retrieve the content, options browsing and selecting particular content from the selected service, and so on. Consequently, techniques that can determine dynamic, playback device-specific content recommendations and then display those recommendations within a device selection screen may lead to an improved user experience.

Figure 4:
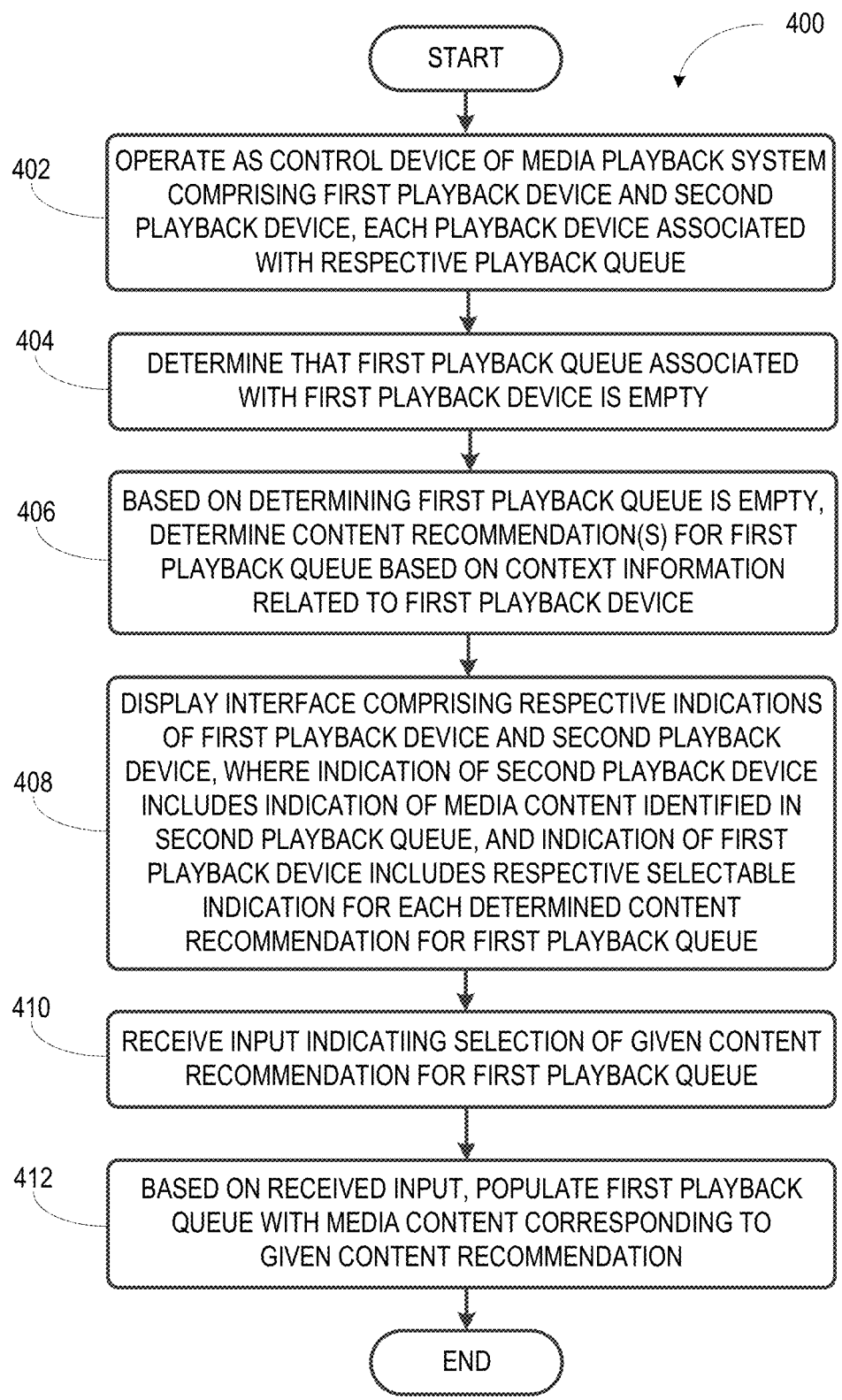
FIG. 4 is a flowchart showing example operations for implementing dynamic content recommendations.

FIG. 4 is a flowchart 400 that illustrates one example implementation for determining and displaying dynamic content recommendations via a computing device will be described in conjunction with FIGS. 5A-6B. In the following examples, the computing device may be, for instance, any of the control devices 130 discussed above and shown in FIG. 1A, 1B, or 1I (e.g., a smartphone, tablet, laptop computer, etc.).

Beginning at block 402, a computing device may operate as a control device of a media playback system that includes at least a first playback device and a second playback device. In this regard, the media playback system may correspond to the media playback system 100 discussed above and shown in FIGS. 1A-1B, and the playback devices may correspond to any of the playback devices 110 discussed above and shown in the corresponding figures.

The first playback device and the second playback device (and other playback devices of the media playback system) may each be associated with a respective playback queue that includes one or more identifiers that may be used by the playback device to retrieve content that the playback device is configured to play back. A playback queue may be stored locally on a given playback device and/or stored remotely from the given playback device (e.g., on a cloud-based computing device, such as one or more of the computing devices 106b shown in FIG. 1B). The identifiers within a given playback queue, and the content corresponding to each identifier, may take various forms. As one example, a content identifier may take the form of a URI or URL that corresponds to an audio track, and a set of URIs or URLs may correspond to a playlist of audio tracks. As another example, a content identifier in a playback queue may correspond to an internet radio station or similar content that streams in real time (or near real-time). Other examples are also possible.

In some scenarios, a playback device's playback queue may be populated with one or more content identifiers, but the playback queue may not be "in use" if the playback device is receiving and playing back content from another source, such as a line-in connection. For instance, a playback device operating as part of a home theater setup may receive audio content from a line-in connection from a television or similar home theater content source. Similarly, a Bluetooth-capable playback device may play back audio content from a Bluetooth-connected content source, during which the playback device's playback queue may not be accessed. Other possibilities also exist.

In still further examples, a given playback device's playback queue may be empty, such that the playback device is not currently configured to play back any content. A playback device's playback queue might become empty for various reasons. As one possibility, a user might input a command to manually clear the playback queue via a media playback system control application running on the computing device. As another possibility, the content indicated in the playback queue might no longer be available. For instance, the playback queue may initially be populated with a URL for a particular streaming event (e.g., a live concert) that expires after the event ends. In these situations, the playback device may determine that the URL is no longer valid and may clear it from the playback queue. Similarly, a playback device may clear a URI from the playback queue if it determines that media content formerly obtainable using a given URI is no longer available (e.g., the media content was removed by the content provider). Further, a playback device may clear content from the playback queue if content in the playback queue has not been played back after a threshold duration of time. Numerous other examples are also possible.

Accordingly, at block 404, the computing device may determine that a first playback queue associated with a first playback device of the media playback system is empty. The computing device might make such a determination in various ways. For instance, the computing device may receive, from one or more playback devices in the media playback system, information regarding each player's playback queue each time a software control application for controlling the media playback system is first launched. As another possibility, an input indicating a command to clear a given playback queue may be received at the computing device. As yet another possibility, each playback device may be configured to transmit, to the computing device, an indication of any changes to its playback queue (e.g., changes made based on commands received from other control devices) whenever the software control application is running on the computing device. This may facilitate the computing device accurately displaying an indication of the playback queue for each playback device. Additionally, or alternatively, in arrangements where a playback device's playback queue is maintained by a cloud-based computing device, the computing device may determine that a playback device's playback queue has been emptied based on communications with the cloud-based computing device. Other possibilities also exist.

Figure 5B:
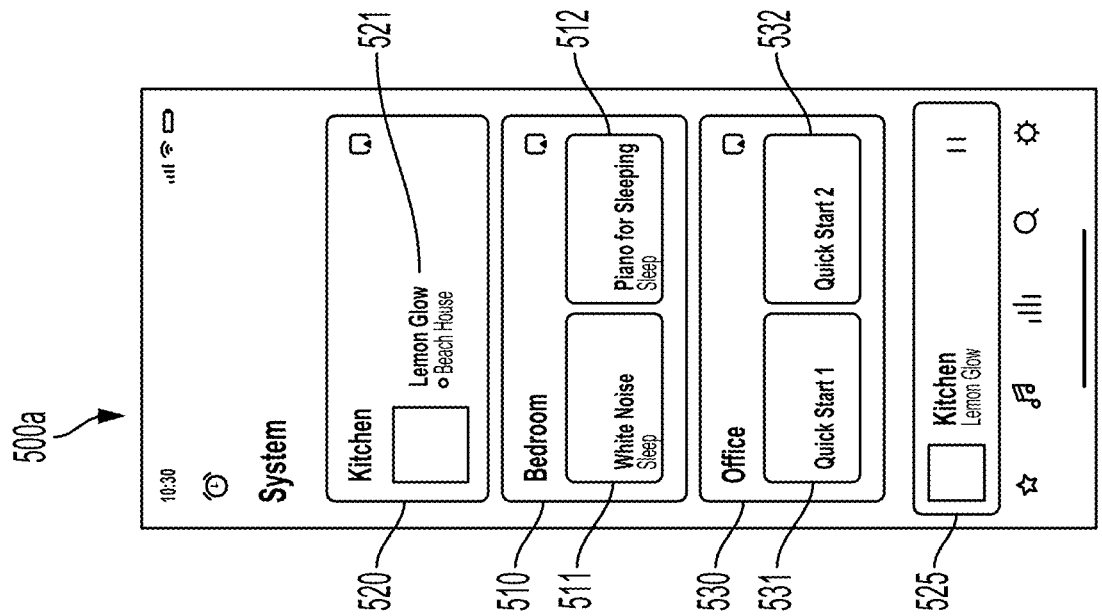
FIG. 5B is another schematic diagram of an example user interface on a control device.
Figure 5A:
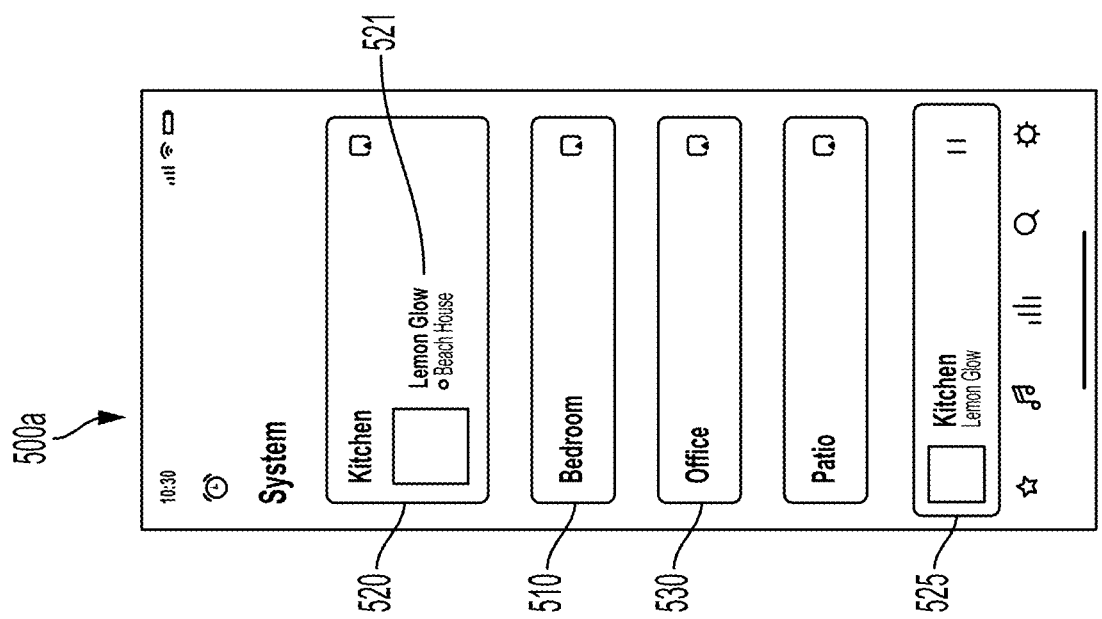
FIG. 5A is a schematic diagram of an example user interface on a control device.

Turning to FIG. 5A, an example user interface 500a of the computing device is shown, which may represent a "System" menu within an example software control application for a media playback system. As shown in FIG. 5A, the user interface 500a includes an indication 510 of a first playback device named "Bedroom," an indication 520 of a second playback device named "Kitchen," an indication 530 of a third playback device named "Office," and so on. The user interface 500a also includes an indication 525 of the currently selected playback device that will receive any playback control commands (e.g., volume commands) that are input by a user at the computing device. In FIG. 5A, the indication 525 depicts the Kitchen playback device as the currently selected playback device. A similar user interface is also shown in FIG. 1I, which refers to an analogous menu as a "Rooms" menu.

As can be seen in FIG. 5A, the indication of each playback includes an indication of media content, if any, identified in the playback queue associated with the playback device. For example, the indication 520 of the Kitchen playback device includes an indication 521 of media content (i.e., the song Lemon Glow by the artist Beach House) identified in the playback queue associated with the Kitchen playback device. However, the corresponding indications of each of the Bedroom, Office, and Patio playback devices are otherwise blank, indicating that the respective playback queue associated with each of these playback devices is empty. In some other implementations, the indication of a playback device that is associated with an empty playback queue may include a more explicit indication, such as a textual indication of "No Music," as shown in the example of FIG. 1I.

As will be appreciated by reviewing FIG. 5A, a user who desires to play back media content using the Bedroom playback device may need to provide several inputs to accomplish their goal. For example, the user may select the indication 510 of the Bedroom playback device to make it the currently selected playback device. Next, the user may open a "Browse" menu by selecting the musical note icon at the bottom of the user interface 500a. Next, the user may make several additional selections within the Browse menu to indicate a media service provider, a saved playlist, an artist, and so on, until the desired media content is located and finally selected for playback. Even in situations where the user has previously saved the desired media content in a "Favorites" menu (e.g., accessible via the star icon at the bottom of user interface 500a), the user must nonetheless provide multiple inputs to select the Bedroom playback device as the current device, select the Favorites menu, and select the previously saved media content.

To streamline user interaction with the user interface 500a, the computing device may insert selectable content recommendations into the indication of any playback devices that are associated with an empty playback queue. It should be noted that, although the examples that follow generally involve the computing device (e.g., a control device of the media playback system) determining content recommendations for empty playback queues, many other arrangements are also possibilities. For example, a playback device may determine content recommendations for itself, or another playback device, upon determining that the relevant playback queue is empty. As another example, a cloud-based computing device (e.g., a cloud-based computing device 106b shown in FIG. 1B) may determine content recommendations for empty playback queues in the media playback system. Other devices within the media playback system, or in communication with the media playback system, are also possible. Further, any combination of these devices may operate in combination to carry out the operations discussed herein.

To facilitate this process, at block 406 the computing device may, based on the determination that the playback queue associated with a given playback device is empty, determine one or more content recommendations for the playback queue associated with the given playback device. In particular, the computing device may determine one or more content recommendations based on context information related to the given playback device.

The context information related to the given playback device may take various forms. For example, the context information may include a name that is assigned to the playback device, which may be used as a basis to determine content recommendations in some cases. A playback device that is named Bedroom may suggest that users might want to play white noise or other relaxing media content via the playback device at night, to help them fall asleep, but other media content during the day. As another example, the context information may include a playback history of the playback device, which may include information regarding the media (e.g., a song, a playlist, an internet radio station, etc.) that the playback device most frequently plays, perhaps also based on the time of the day and/or the day of the week. The playback history may also include information regarding the media that the playback device most recently played. In some situations, the playback history of the playback device may be user-specific, depending on the media playback system user account that is associated with the computing device. Playback history information may also be used as a basis to determine recommended content that may be related to content the user has listened to before. This might include different music from the same artist, similar music (e.g., a similar genre of music) from different artist, newly available podcast episodes from a program the user is subscribed to, similar podcasts to those the user is subscribed to, etc.

In some implementations, the content recommendations may include promoted content (e.g., content being promoted by content providers), that is identified based on the context information related to the playback device. For instance, promoted content might include a new internet radio station, a new artist, or a new album that is similar to other content previously played by the playback device. Further, promoted content may include previously-released content from an artist leading up to the release of a new album. Still further, promoted content might include advertisements that are determined based on any of the context information noted above, some examples of which are discussed further below in relation to FIG. 5E. Other types of promoted content also exist.

As yet another example, the context information related to the given playback device may be based, in whole or in part, on user-input preference information related to content recommendations, examples of which are discussed in further detail below with respect to FIGS. 6A-6B. The context information related to a given playback device may take numerous other forms as well.

The computing device may determine the content recommendations for the given playback device based on the context information in various ways. For instance, in some implementations, some or all of the context information that is used to determine the content recommendations may be stored at a device other than the computing device, such as the given playback device and/or a cloud-based computing device. Thus, the computing device may request the context information related to the given playback device before using it to determine the content recommendations. Alternatively, as suggested above, the computing device may receive the content recommendations from the cloud-based computing device, the given playback device, and/or other devices in the media playback system after transmitting a request for the recommendations. Other possibilities also exist.

At block 408, the computing device may display a user interface that includes indications of the playback devices in the media playback system, as discussed above. For any playback device that is associated with a playback queue that is not empty, the indication of the playback device may include an indication of media content identified in the associated playback queue. In addition, the user interface may include, for any playback device that is associated with a playback queue that is empty, selectable indications for one or more of the determined content recommendations for the associated playback queue.

An example of this can be seen in the updated user interface 500a shown in FIG. 5B, where instead of the blank space shown in FIG. 5A, the indication 510 of the Bedroom playback device now includes selectable indications 511 and 512 for two determined content recommendations. In particular, the indication 511 depicts recommended White Noise content (e.g., a repeating audio track) and the indication 512 depicts recommended Piano for Sleeping content (e.g., a playlist of audio tracks), both of which may have been determined based on one or more aspects of the context information discussed above. In this way, the selectable indications 511 and 512 may act as shortcuts that the user may select, with a single input to begin playing back the indicated content. In some cases, playback queue associated with the Bedroom playback device may be populated with the determined content recommendation(s) prior to beginning playback.

A similar result can be seen within the indication 530 of the Office playback device, which was also associated with an empty playback queue in FIG. 5A. In particular, indication 530 of the Office playback device now includes indications 531 and 532 for recommended content that the computing device determined for the playback queue associated with Office playback device. In particular, the indication 531 depicts Quickstart 1 and the indication 532 depicts Quickstart 2, both of which may represent user-designated quickstart content that may include a selected playlist, internet radio station, audiobook, or the like, as discussed above.

In some implementations, the computing device may cause one or more playback devices for which it determined content recommendations to pre-cache a first portion of the recommended content in a temporary buffer or similar location, without populating its empty playback queue. If the content is selected, this may facilitate a rapid start to playback of the content and allow the playback device to populate its playback queue and retrieve the remainder of the content while the first portion is played back. For example, the computing device may cause the Bedroom playback device to retrieve a relatively small portion (e.g., the first ten seconds) of both the White Noise audio track identified in indication 511 and the Piano for Sleeping playlist identified in indication 512. Other examples are also possible.

At block 410, the computing device may receive an input indicating a selection of a given content recommendation, as noted above. At block 412, based on the received input, the computing device may populate the given playback queue with media content corresponding to the given content recommendation. In some implementations, selection of a given content recommendation may additionally cause the computing device to update the indication of the currently selected playback device to reflect the given playback device.

For instance, a user may select, via the user interface 500a, the selectable indication 511 within the indication 510 of the Bedroom playback device. Based on the input selecting the indication 511, the computing device may populate the playback queue of the Bedroom playback device with the White Noise audio track identified by the indication 511, and the Bedroom playback device may begin the play back the audio track. In addition, the computing device may update the user interface 500a to reflect that the playback queue associated with the Bedroom playback device is no longer empty. Consequently, the indication 510 of the Bedroom playback device may be updated to remove indications of other content recommendations (e.g., the indication 512) and to include an indication of the White Noise audio track that is now identified in the playback queue, similar to the appearance of the indication 520 of the Kitchen playback device. Still further, the computing device may update the indication 525 of the currently selected playback device to indicate the Bedroom playback device.

In some implementations, a playback queue for which a content recommendation was selected may revert back to an empty state after the recommended content stops playing. This scenario might occur if the recommended content is time-limited (e.g., a live event, promoted content, etc.) or otherwise transient in nature. In other implementations, the playback queue may remain populated with the recommended content (e.g., a playlist, a radio station, etc.) until the queue is otherwise cleared.

Turning to now FIG. 5C, another example of the user interface 500a is depicted that reflects various additional implementations of concepts discussed above. For instance, the examples discussed above with reference to FIG. 5B have included two content recommendations for each playback device associated with an empty queue, however the number of recommendations does not need to be limited in this way. Rather, the user interface 500*a* may facilitate the display of additional content recommendations that a user may access. One such example is shown in the indication 510 of the Bedroom playback device shown in FIG. 5C, where a user can scroll the indications to the side—as indicated by the arrow 550—to reveal additional recommendations. In some other examples, the indications for each content recommendation may additional or alternatively be scrollable in a vertical direction, which may correspond to browsing the recommendations according to different criteria. For instance, scrolling horizontally may reveal recommendations by different artists, whereas scrolling vertically may reveal different recommended content by the same artist.

In some implementations, each content recommendation that is initially displayed may be determined from a different type of content (e.g., radio station, curated playlists, etc.). Thus, a user may scroll horizontally to view content recommendations across different types of content. Further, and similar to the discussion above, the user might also be able to scroll vertically on a content recommendation of a given type to reveal additional recommended content within that content type. Numerous other variations are also possible.

FIG. 5C also depicts an indication 540 of a playback group including the Office playback device and the Patio playback device that have been grouped for synchronous playback. In this regard, the playback group may be associated with a group queue that, similar to the individual playback queues discussed above, may be empty. Accordingly, the computing device may determine one or more content recommendations for the group queue, and the indication 540 of the playback group may include indications 531 and 532 for the determined content recommendations. In some scenarios, one or both the Office playback device and the Patio playback device may each have populated playback queues when they are not grouped. In such a case, the determined content recommendations may include content from the respective playback queues of the Office Playback device and the Patio playback device when they are not grouped.

Still further, there may be situations where a user is presented with a content recommendation for a first playback device that is associated with an empty queue, but the user wants to play the recommended content on a second playback device different from the first playback device associated with the recommendation and the empty queue. In these situations, the user interface 500*a* may facilitate assigning the content recommendation to the second playback device via one or more inputs that collectively indicate (i) a selection of the content recommendation for the empty queue of the first playback device and (ii) an assignment of the content recommendation to the second playback device. For instance, the user may long press on the indication for a given recommendation, which after a predetermined time period (e.g., 1 second, 2 seconds, etc.) might make the recommendation assignable to another playback device (e.g., by dragging the indication to another location in the user interface 500*a*).

An example of this type of interaction is shown in FIG. 5D and is reflected by the arrows 551 and 552. In particular, the arrow 551 depicts an assignment of the content recommendation for Quickstart 2 from the Office playback device to the Bedroom playback device. In line with the examples above, this may cause the Bedroom playback device to begin playback of content corresponding to Quickstart 2. In some cases, the empty playback queue associated with the Bedroom playback device may be populated with content corresponding to Quickstart 2. The other recommendations from the indication 510 of the Bedroom playback device may then be cleared because the Bedroom playback device is now playing content and/or because the playback queue associated with the Bedroom playback device is no longer empty.

In a similar way, the user might be able to assign a content recommendation to a playback device that is not associated with an empty queue. As shown by the arrow 552 in FIG. 5D, the content recommendation for Quickstart 2 may be assigned from the Office playback device to the Kitchen playback device. In some implementations, this may cause the playback queue associated with the Kitchen playback device to be cleared and replaced with the content corresponding to the recommendation for Quickstart 2. In some other implementations, this may cause the content corresponding to the recommendation for Quickstart 2 to be added to the end of the playback queue associated with the Kitchen playback device. In some further implementations, this may cause the content corresponding to the recommendation for Quickstart 2 to be played back by the Kitchen playback device, while maintaining the existing queue associated with the Kitchen playback device (e.g., in an inactive state) such that playback of the existing queue may continue after playback of the content corresponding to the recommendation for Quickstart 2 stops.

In both of the examples discussed above involving assignment of content recommendations, the playback queue associated with the playback device for which the content recommendation was originally determined—the Office playback device—remains empty. In this situation, the indication 532 for the Quickstart 2 content recommendation may remain displayed within the indication 530 for the Office playback device, even after the content recommendation is assigned elsewhere. Alternatively, if a content recommendation for a given playback device is assigned to a different playback device, the computing device may replace that content recommendation for the given playback device with a different recommendation.

As noted above, in some implementations the content recommendations determined by the computing device may include promoted content, which might include a new internet radio station, a new artist, or a new album that is similar to, or otherwise correlated with other content previously played by the playback device. Such an implementation is shown in FIG. 5E, in which the indication 530 of the Office playback device includes an indication 533 for a promoted content recommendation.

Further, some promoted content may take the form of advertisements that are based on context information related to the playback device, as noted above. For example, a content recommendation that takes the form of an advertisement may include a visual representation of the product or service being advertised, and selection of the advertisement may allow the user to hear about the pictured product or service. Similar to the examples above, selection of the advertisement may cause the empty playback queue associated with the playback device to be populated with content related to the visual advertisement. In some implementations, when the content corresponding to the recommended advertisement finishes playing, the computing device and/or the playback device may clear the playback queue so that it returns to an empty state, rather then remaining populated with the content corresponding to the advertisement. Other examples are also possible.

FIG. 5E depicts an example in line with the discussion above, in which an indication 534 for an advertisement is displayed within the indication 530 of the Office playback device. In this example, the advertisement may be an advertisement for Office supplies, and may have been determined based on the name assigned to the playback device. As another example, an advertisement to buy tickets for an upcoming concert may be determined based on the playback history of the playback device including content from the artist who will be performing the concert. As yet another example, an advertisement may include products or services associated with the media playback system. For instance, the computing device may determine, for a home theater device (e.g., a soundbar) with an empty playback queue, an advertisement for other playback devices (e.g., a subwoofer, surrounds) that may be paired with the home theater device. Further, the computing device may determine that a user has never performed audio calibration for the given playback device. Based on this context information, the computing device may determine an advertisement for a calibration feature provided by the media playback system, which the user can select to learn more about the process. Numerous other types of advertisements based on contextual information relating to playback devices are possible.

In some cases, selection of a recommended advertisement may cause only playback of audio content corresponding to the advertisement by the given playback device. In some other cases, selection of the advertisement may additionally or alternatively open a window within the current user interface (e.g., interface 500a) or in a user interface of a different application on the computing device to display corresponding information related to the advertisement.

As noted above, the computing device may receive one or more inputs indicating preference information related to content recommendations. In this regard, the preference information may represent some or all of the context information on which the computing device bases its determination of content recommendations for a given playback device.

The user preferences related to content recommendations may be customizable in numerous ways. For instance, a user may opt to receive content recommendations for empty playback queues associated with all playback devices in the media playback system, or alternatively may opt out of receiving content recommendations for the entire media playback system. Further, the user may specify the playback devices for which they want to receive content recommendations and those for which they do not. Similarly, the user may set bounds on the time of day or day of the week to show recommendations (e.g., only show recommendations for specific playback devices on weekday evenings and on the weekend).

Still further, the user may set preferences related to the type of content for which they would like to receive recommendations. For instance, the user may set a preference, for a given playback device, to never receive podcast recommendations (or to only receive podcast recommendations). As another example, the user may set a preference to never receive (or only receive) content recommendations from a particular media content service.

Still further, the user may set preferences related to the type of content they prefer to hear when engaged in certain activities. In this regard, context information related to a given playback device, perhaps in conjunction with context information from other devices within the media playback system, may be used to predict a likely activity that the user may be engaged in. Thus, the computing device may determine one or more content recommendations that may accompany the predicted activity.

FIGS. 6A-6B illustrate examples of a user interface 500b via which a user may enter preference information regarding content recommendations according to some of the examples herein. In FIG. 6A, the user interface 500b provides several options 561 for a user to select the type of content they prefer to hear when they are cooking, as denoted in the indication 560. If the user indicates preferred content to hear when they are cooking, the computing device might thereafter determine, based on the time of day (e.g., evening) and the name assigned to a given playback device (e.g., Kitchen), that content recommendations that are determined for the Kitchen playback device should be based on the preference information entered by the user. In FIG. 6A, the content options 561 may correspond to the type of internet radio station the user likes to listen to, however the user might indicate their preferences based on other criteria as well. Further, the user may set similar preferences for various other activities that may be predicted based on context information, such as working, sleeping, cleaning, relaxing by the pool, and so on.

Turning to FIG. 6B, another example of the user interface 500b is shown that provides several categories from which a user may select the type of content they prefer to hear from a specific playback device, namely a playback device that has been assigned the name Living Room, as denoted in the indication 570. From the user interface 500b, the user may select the category of QuickStarts 571, which may present a list of quickstart content previously defined by the user. The user may also select the category of Radio Stations 572, which may present a list of internet radio station similar to the list shown in FIG. 6A, from which the user may select their preferred radio stations. Further, the user may select the category denoted as Other Playlists 573, which may present an aggregated set of playlists that the user has created across various different media content services. Thereafter, the computing device may determine content recommendations for the Living Room playback device based on the user preference information entered by the user.

User preference information related to content recommendations may take numerous other forms as well.

FIG. 4 includes one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowchart shown in FIG. 4 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIGS. 5-8 may represent circuitry and/or machinery that is wired or arranged to perform the specific functions in the process.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/ or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A computing device comprising:
at least one processor;

non-transitory computer-readable medium; and
program instructions stored on the non-transitory computer-readable medium that are executable by the at least one processor such that the computing device is configured to:
  operate as a control device of a media playback system comprising at least a first playback device and a second playback device, each playback device associated with a respective playback queue;
  determine that a first playback queue associated with the first playback device is empty;
    based on the determination that the first playback queue is empty, determine one or more content recommendations for the first playback queue based on context information related to the first playback device;
    display an interface comprising respective indications of the first playback device and the second playback device, wherein:
      the indication of the second playback device includes an indication of media content identified in a second playback queue associated with the second playback device; and
      the indication of the first playback device includes a respective selectable indication for each of the determined one or more content recommendations for the first playback queue;
    receive an input via the interface that comprises the respective indications of the first playback device and the second playback device, the input indicating a selection of a given selectable indication for a given content recommendation of the one or more content recommendations for the first playback queue; and
    based on the received input, populate the first playback queue with media content corresponding to the given content recommendation.

2. The computing device of claim 1, wherein the program instructions that are executable by the at least one processor such that the computing device is configured to determine one or more content recommendations for the first playback queue based on context information related to the first playback device comprise program instructions that are executable by the at least one processor such that the computing device is configured to determine two or more content recommendations for the first playback queue, and wherein the indication of the first playback device includes an indication of the determined two or more content recommendations for the first playback queue.

3. The computing device of claim 1, wherein the context information related to the first playback device comprises one or more of a playback history of the first playback device, a day, a time, a name assigned to the first playback device, or a media playback system user account associated with the computing device.

4. The computing device of claim 1, further comprising program instructions stored on the non-transitory computer-readable medium that are executable by the at least one processor such that the computing device is configured to:
  receive one or more inputs indicating preference information related to content recommendations, wherein the context information related to the first playback device comprises the preference information.

5. The computing device of claim 1, wherein the program instructions that are executable by the at least one processor such that the computing device is configured to determine one or more content recommendations for the first playback queue based on context information related to the first playback device comprise program instructions that are executable by the at least one processor such that the computing device is configured to determine one or more advertisements based on context information related to the first playback device, and wherein the indication of the determined one or more content recommendations comprises an indication of the one or more advertisements.

6. The computing device of claim 5, further comprising program instructions stored on the non-transitory computer-readable medium that are executable by the at least one processor such that the computing device is configured to:
  receive an input indicating a selection of a given advertisement of the one or more advertisements; and
  based on the received input, cause the first playback device to play back media content corresponding to the given advertisement.

7. The computing device of claim 1, wherein the first playback device is a member of a synchrony group that includes at least a third playback device, and wherein the first playback queue is associated with the synchrony group.

8. The computing device of claim 1, wherein the program instructions that are executable by the at least one processor such that the computing device is configured to determine one or more content recommendations for the first playback queue based on context information related to the first playback device comprise program instructions that are executable by the at least one processor such that the computing device is configured to receive, from a cloud-based computing system, the one or more content recommendations for the first playback queue.

9. The computing device of claim 1, wherein the respective selectable indication for each of the determined one or more content recommendations for the first playback queue is assignable, via the displayed interface, to a playback queue of the media playback system other than the first playback queue.

10. The computing device of claim 9, the computing device further comprising program instructions stored on the non-transitory computer-readable medium that are executable by the at least one processor such that the computing device is configured to:
  receive one or more inputs collectively indicating (i) a selection of the given selectable indication for the given content recommendation of the one or more content recommendations for the first playback queue and (ii) an assignment of the given content recommendation to the second playback device; and
  based on the received one or more inputs, replace the media content identified in the second playback queue with media content corresponding to the given content recommendation.

11. The computing device of claim 1, wherein the program instructions that are executable by the at least one processor such that the computing device is configured to determine that a first playback queue associated with the first playback device is empty comprise program instructions that are executable by the at least one processor such that the computing device is configured to determine that previously-available content identified in the first playback queue is no longer available; and
  wherein the computing device further comprising program instructions stored on the non-transitory computer-readable medium that are executable by the at least one processor such that the computing device is configured to:

update the indication of the first playback device to (i) remove an indication of the previously-available content and (ii) include an indication of an empty queue.

12. A non-transitory computer-readable medium, wherein the non-transitory computer-readable medium is provisioned with program instructions that, when executed by at least one processor, cause a computing device to:
  operate as a control device of a media playback system comprising at least a first playback device and a second playback device, each playback device associated with a respective playback queue;
  determine that a first playback queue associated with the first playback device is empty;
  based on the determination that the first playback queue is empty, determine one or more content recommendations for the first playback queue based on context information related to the first playback device;
  display an interface comprising respective indications of the first playback device and the second playback device, wherein:
    the indication of the second playback device includes an indication of media content identified in a second playback queue associated with the second playback device; and
    the indication of the first playback device includes a respective selectable indication for each of the determined one or more content recommendations for the first playback queue;
  receive an input via the interface that comprises the respective indications of the first playback device and the second playback device, the input indicating a selection a given selectable indication for of a given content recommendation of the one or more content recommendations for the first playback queue; and
  based on the received input, populate the first playback queue with media content corresponding to the given content recommendation.

13. The non-transitory computer-readable medium of claim 12, wherein the program instructions that, when executed by at least one processor, cause the computing device to determine one or more content recommendations for the first playback queue based on context information related to the first playback device comprise program instructions that, when executed by at least one processor, cause the computing device to determine two or more content recommendations for the first playback queue, and wherein the indication of the first playback device includes an indication of the determined two or more content recommendations for the first playback queue.

14. The non-transitory computer-readable medium of claim 12, wherein the context information related to the first playback device comprises one or more of a playback history of the first playback device, a day, a time, a name assigned to the first playback device, or a media playback system user account associated with the computing device.

15. The non-transitory computer-readable medium of claim 12, wherein the first playback device is a member of a synchrony group that includes at least a third playback device, and wherein the first playback queue is associated with the synchrony group.

16. The non-transitory computer-readable medium of claim 12, wherein the program instructions that, when executed by at least one processor, cause the computing device to determine one or more content recommendations for the first playback queue based on context information related to the first playback device comprise program instructions that, when executed by at least one processor, cause the computing device to receive, from a cloud-based computing system, the one or more content recommendations for the first playback queue.

17. The non-transitory computer-readable medium of claim 12, wherein the respective selectable indication for each of the determined one or more content recommendations for the first playback queue is assignable, via the displayed interface, to a playback queue of the media playback system other than the first playback queue.

18. The non-transitory computer-readable medium of claim 17, wherein the non-transitory computer-readable medium is also provisioned with program instructions that, when executed by at least one processor, cause the computing device to:
  receive one or more inputs collectively indicating (i) a selection of the given selectable indication for the given content recommendation of the one or more content recommendations for the first playback queue and (ii) an assignment of the given content recommendation to the second playback device; and
  based on the received one or more inputs, replace the media content identified in the second playback queue with media content corresponding to the given content recommendation.

19. The non-transitory computer-readable medium of claim 12, wherein the program instructions that, when executed by at least one processor, cause the computing device to determine that a first playback queue associated with the first playback device is empty comprise program instructions that, when executed by at least one processor, cause the computing device to determine that previously-available content identified in the first playback queue is no longer available; and
  wherein the non-transitory computer-readable medium is also provisioned with program instructions that, when executed by at least one processor, cause the computing device to:
  update the indication of the first playback device to (i) remove an indication of the previously-available content and (ii) include an indication of an empty queue.

20. A method carried out by a computing device, the method comprising:
  operating as a control device of a media playback system comprising at least a first playback device and a second playback device, each playback device associated with a respective playback queue;
  determining that a first playback queue associated with the first playback device is empty;
  based on the determination that the first playback queue is empty, determining one or more content recommendations for the first playback queue based on context information related to the first playback device;
  displaying an interface comprising respective indications of the first playback device and the second playback device, wherein:
    the indication of the second playback device includes an indication of media content identified in a second playback queue associated with the second playback device; and
    the indication of the first playback device includes a respective selectable indication for each of the determined one or more content recommendations for the first playback queue;
  receiving an input via the interface that comprises the respective indications of the first playback device and the second playback device, the input indicating a selection of a given selectable indication for a given content recommendation of the one or more content recommendations for the first playback queue; and based on the received input, populating the first playback queue with media content corresponding to the given content recommendation.

\* \* \* \* \*